H. C. JOHNSON.
STOCK FOUNTAIN.
APPLICATION FILED JULY 3, 1909.
963,578.
Patented July 5, 1910.
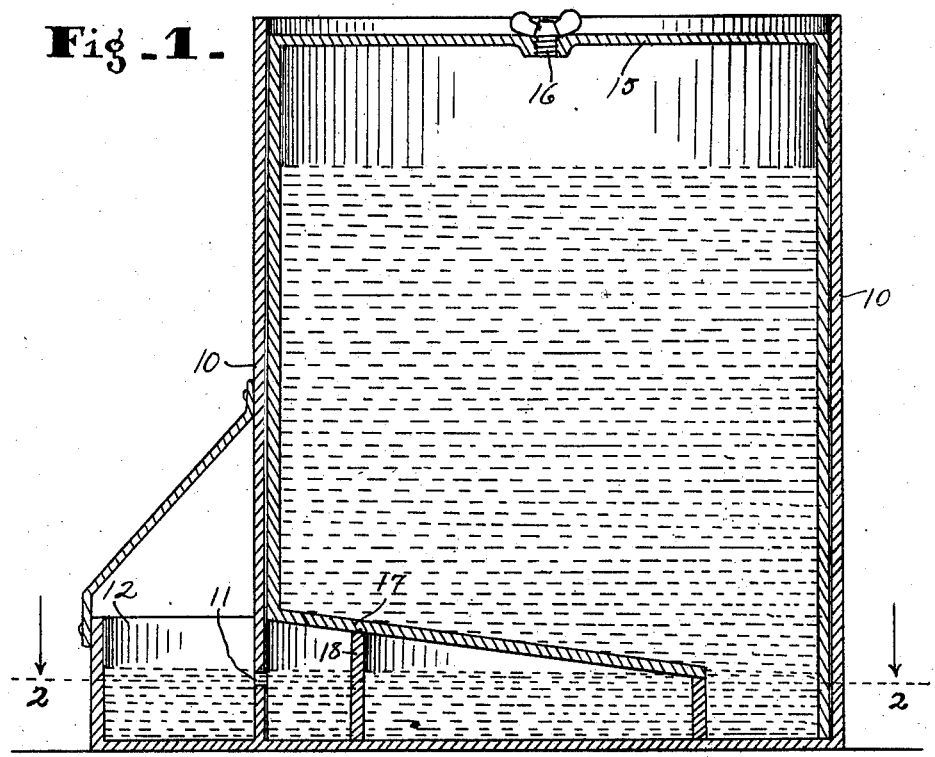
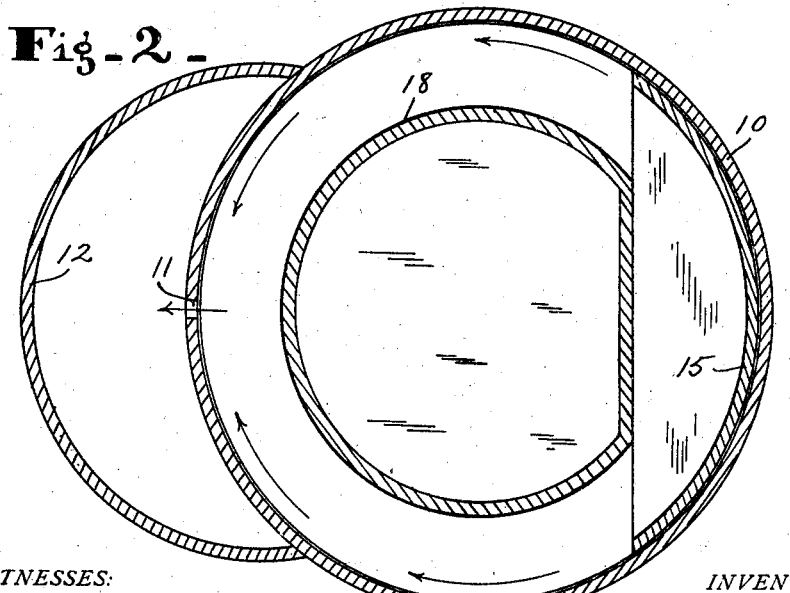
WITNESSES:
W. M. Gautte
O. M. McLaughlin
INVENTOR.
Henry C. Johnson.
BY
V. H. Lockwood.
ATTORNEY.

UNITED STATES PATENT OFFICE.

HENRY C. JOHNSON, OF INDIANAPOLIS, INDIANA.

STOCK-FOUNTAIN.

963,578.

Specification of Letters Patent. Patented July 5, 1910.

Application filed July 3, 1909. Serial No. 505,842.

*To all whom it may concern:*

Be it known that I, HENRY C. JOHNSON, of Indianapolis, county of Marion, and State of Indiana, have invented a certain new and useful Stock-Fountain; and I do hereby declare that the following is a full, clear, and exact description thereof, reference being had to the accompanying drawings, in which like numerals refer to like parts.

The object of this invention is to provide an improved construction of watering tank for animals that supplies the water automatically to the trough.
The chief feature of the invention consists in providing an outer tank with which the trough is connected, and an inner tank removably deposited within the outer tank and closed at the top and arranged to hold water, the bottom of said inner tank sloping from a point above the outlet to the trough downwardly and having a suitable outlet to the lower part of the outer tank at a point substantially on a level with the outlet to the trough. Preferably the sloping bottom of the inner tank extends only partially across the lower part of said tank, the remaining portion thereof forming the outlet to the outer tank, and one side of the inner tank is extended down to engage the bottom of the outer tank for assisting in supporting the inner tank. This latter extension is a portion of the shell of the inner tank which surrounds the opening in the bottom of said inner tank in the form of an arc. The sloping bottom of the inner tank rests upon any suitable loose support, so that the inner tank is readily removable. This invention renders the construction of such tanks very cheap, strong and simple.

The nature of the invention will be understood from the accompanying drawings and the following description and claims.

In the drawings Figure 1 is a central vertical section through the device and showing it partially filled with water. Fig. 2 is a horizontal section on the line 2—2 of Fig. 1.

In detail there is shown a plain cylindrical outer tank 10 open at the top and closed at the bottom, with a hole or opening 11 through one side and near the bottom that discharges the water from said tank into the trough 12 that is connected with the lower part of said tank at one side and is open at the top, so that the animals can drink out of it.

An inner water holding tank 15 is provided that fits loosely in the outer tank, so that there will be space for the passage of air. It has a centrally located opening at the top thereof that is closed by the plug 16 so as to be air-tight. Said inner tank 15 is filled with water through this opening at the top and when the plug is closed the outer pressure of air will hold the water up in the tank, excepting as air is admitted as a portion of the water is consumed or removed from the trough. The bottom 17 of the inner tank slopes downwardly from a point higher than the discharge opening 11 to the trough and preferably on a level with the top of the trough. In the particular form herein shown, but to which this invention is not necessarily limited, said sloping bottom extends only partially across the bottom of the inner tank so as to leave an opening from the inner tank to the outer tank that is substantially on a level with the discharge hole 11 into the trough. It is immaterial how this opening from one tank into the other is formed, but it is material that the bottom 17 shall slope from a point above the outlet 11 to a point at least on a level with it so as to form an air chamber below said bottom and above the level of the water in the lower part of the outer tank 10. This air chamber is in communication with the outside air by reason of the space between the two tanks, and its purpose is to permit the expansion of the water in the lower part of the outside tank to compensate for any temporary abnormal expansion of the air in the upper part of the inner tank above the column of water, due usually to the heat of the sun. Suction in the upper part of the inner tank or, preferably speaking, the external air pressure on the portion of the water in the trough and lower part of the outer tank holds the column of water up in the inner tank and does not let it down only as fast as it is consumed or removed from the trough. When the water is lowered in the trough in the lower part of the outer tank, an equivalent amount of air passes under the bottom 17 of the inner tank and through the opening therein and bubbles up through the water in the inner tank to the top. In this way a feed of the water from the inner tank to the trough is maintained automatically.

In the form herein shown and to which the invention is not necessarily limited as stated, the bottom plate 17 extends only partially across the bottom of the tank 15, and the wall of the tank around the opening through the bottom thereof extends down to the bottom of the outer tank and rests thereon and furnishes the support for one side of the inner tank. That is shown in Fig. 2. The other side of the water tank is supported upon a loose support 18 resting upon the bottom of the outer tank and under the sloping bottom of the inner tank, as shown. This is usually formed from the portion of the lower side wall of the inner tank that is cut away to form a space or chamber on the sloping bottom 17, so that it is very conveniently made and handled.

For filling, the outlet 11 is corked or stopped in some way temporarily and the plug 16 removed and the inner tank filled. The plug 16 is then replaced air-tight and the stopper removed from the outlet hole 11. At any time the inner tank can be readily lifted out and the tanks cleaned. It is observed that both the outer tank and water trough are easily cleaned because they have a plain surface, and likewise the inner tank is easily cleaned because of the large opening in the bottom through which a person can extend his arm easily for scrubbing the side and bottom of the tank.

While the outlet from the inner tank is here shown in the bottom thereof, still that is not a necessary position of said outlet, as it may be anywhere in the lower portion of said tank on a level with the outlet to the trough.

What I claim as my invention and desire to secure by Letters Patent is:

1. A stock watering device including an outer tank, a trough adjacent to the lower part thereof and in communication therewith through a suitable outlet, an inner tank loosely insertible in and supported on the bottom of the outer tank and which is closed at the top and has a bottom sloping from a point above the outlet to the trough to a point as low as said outlet so there will be an air chamber below the sloping bottom in communication with the outside air and with an opening in said bottom that is substantially on a level with the outlet to the trough.

2. A stock watering device including an outer tank, a trough adjacent to the lower part thereof and in communication therewith through a suitable outlet opening, an inner tank loosely insertible in the outer tank and which is closed at the top and with the bottom thereof partially closed by a bottom plate sloping from a point above the outlet to the trough to a point on a level with said outlet and the side wall of said inner tank at its lower end extending down around the opening through the bottom to furnish a support for one side of said tank, and means between the bottom of the outer tank and the sloping bottom of the inner tank for supporting the latter so there will be an air chamber below the sloping bottom in communication with the outside air.

In witness whereof, I have hereunto affixed my signature in the presence of the witnesses herein named.

HENRY C. JOHNSON.

Witnesses:
G. H. BOINK,
O. M. McLAUGHLIN.